Aug. 17, 1954  L. F. PESSOA  2,686,406
AIR CONDITIONER
Filed Dec. 6, 1950  4 Sheets-Sheet 2
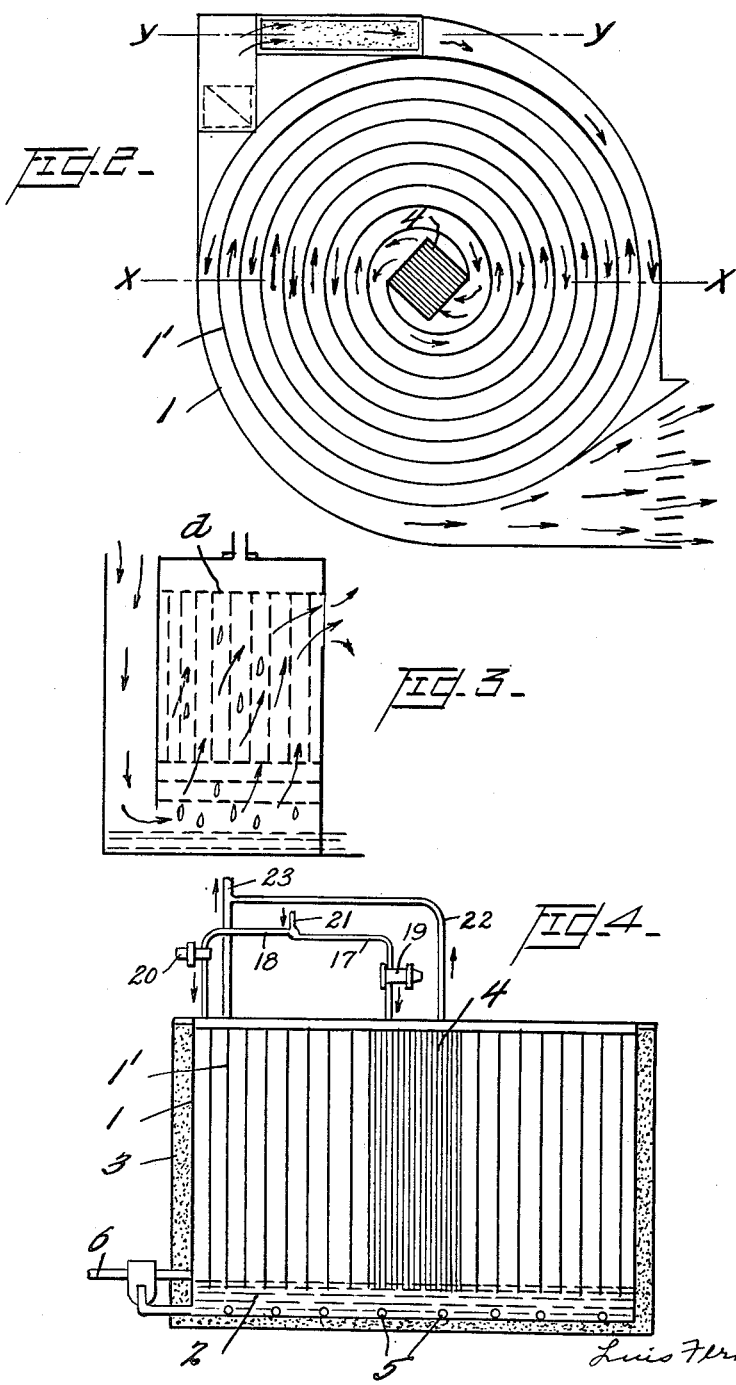
INVENTOR
Luis Fernandes Pessoa
BY Watson, Cole, Grindle & Watson
ATTORNEY Aug. 17, 1954  L. F. PESSOA  2,686,406
AIR CONDITIONER
Filed Dec. 6, 1950  4 Sheets-Sheet 3
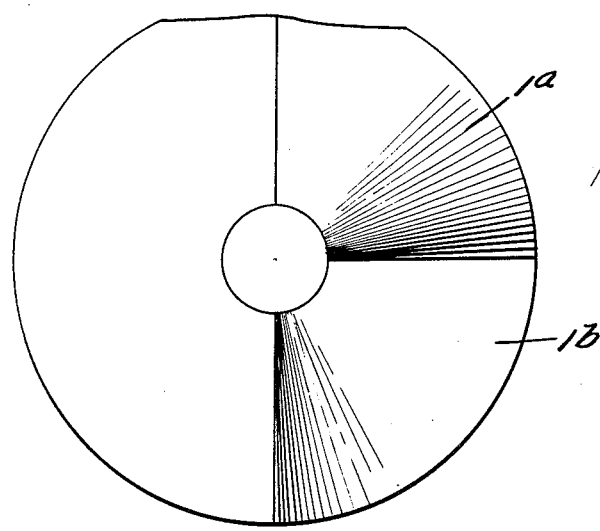
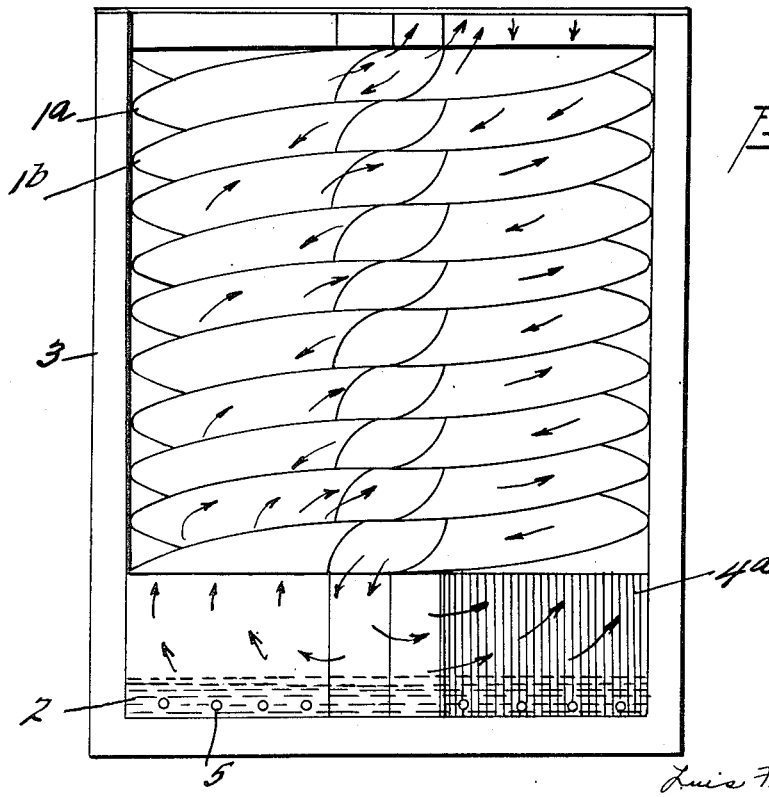
INVENTOR
Luis Fernandes Pessoa
BY Watson, Cole, Grindle & Watson
ATTORNEY Aug. 17, 1954     L. F. PESSOA     2,686,406
AIR CONDITIONER
Filed Dec. 6, 1950     4 Sheets-Sheet 4
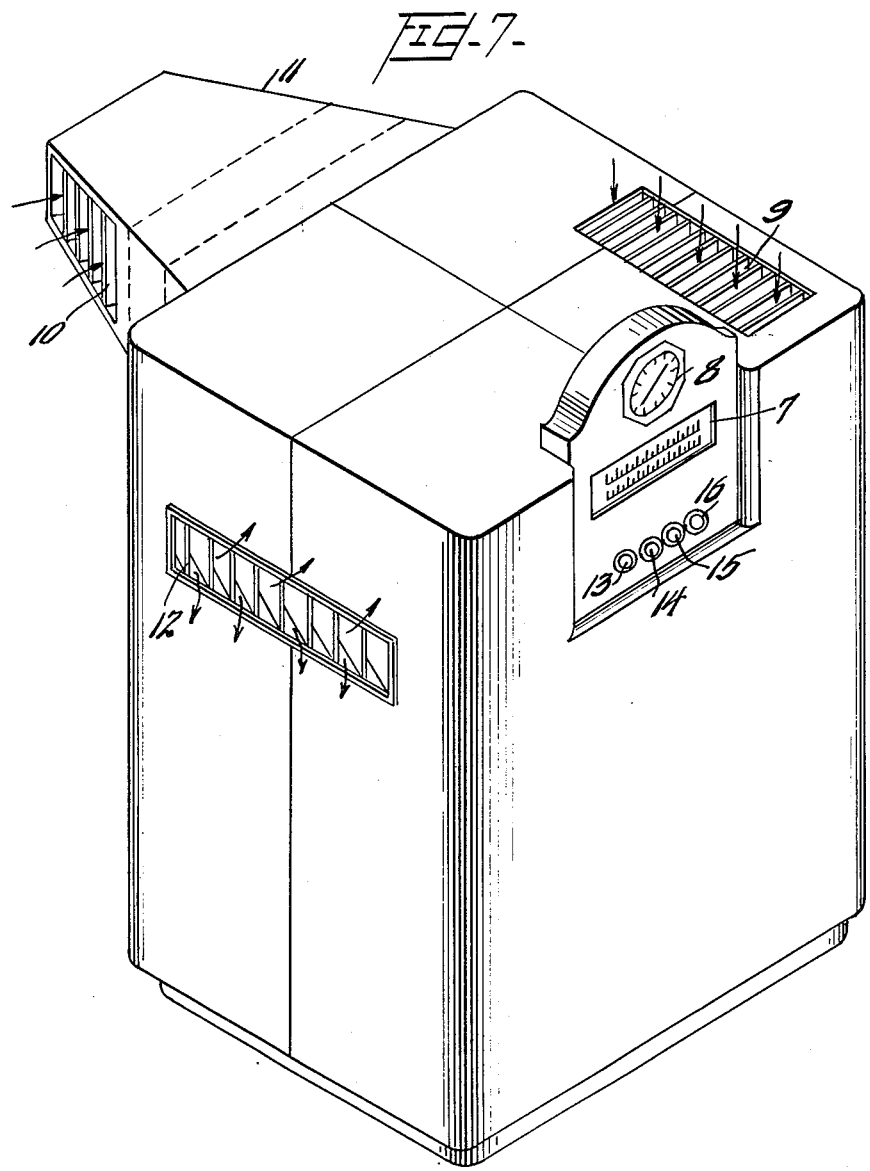
INVENTOR
Luis Fernandes Pessoa
BY Watson, Cole Grindle & Watson
ATTORNEY Patented Aug. 17, 1954

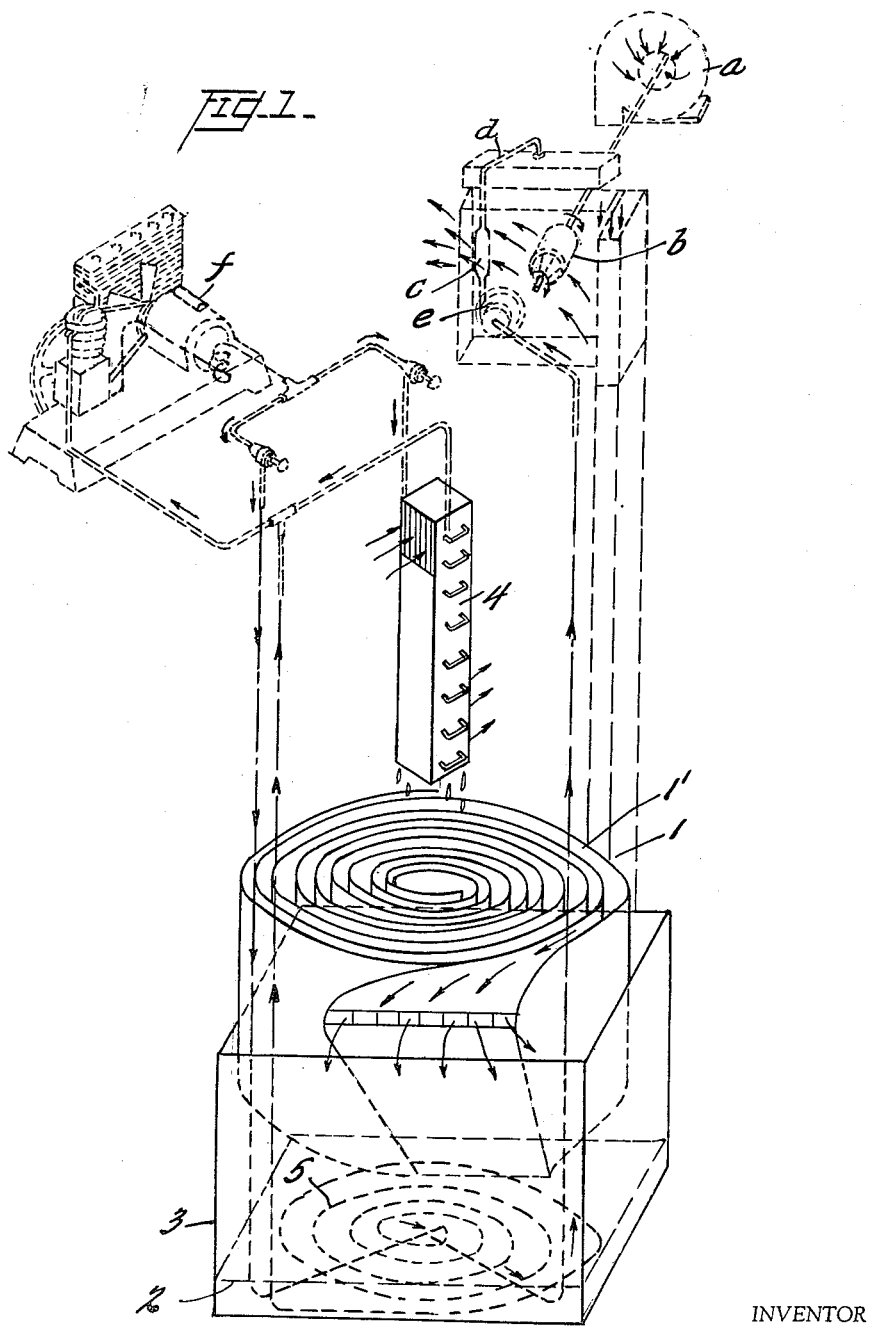

2,686,406

UNITED STATES PATENT OFFICE 2,686,406

AIR CONDITIONER

Luis Fernandes Pessoa, Rio de Janeiro, Brazil

Application December 6, 1950, Serial No. 199,413

3 Claims. (Cl. 62—140)

1

The present invention relates to a method for the climatization of ambients and to apparatus for treating the air of certain ambient atmospheres, modifying its humidity and temperature, and cleaning it of microbes, dust and pollens in suspension.

Certain commonly known apparatuses, generally called air conditioners or air coolers, first filter the air and then cool it. For filtering the air the apparatus is equipped at the intake with a wet filter consisting of metallic screens which are constantly moistened by a spray of cold water. These screens remove the micro-organisms as well as toxic and explosive gases, and the spray water may be made disinfectant, reducing or acidulous as required by the atmosphere. To cool the filtered air, the latter is forced through a spray or mist of water at 4° C., evaporating part of it and losing calories, which are absorbed by the water, so that the temperature of the air decreases in direct proportion to the B. t. u. absorbed by the cooling water.

One may observe that in rooms conditioned by this common type of air conditioners, although the air is cool it is somewhat humid, sometimes causing discomfort, chills and at times colds. Besides this, the humidity of the air is propitious to the existence of microbes and pollen.

To eliminate these inconveniences it would be necessary to de-humidify or dry the air which is exactly the object of the present invention.

The method according to the invention consists in submitting the filtered and cooled air of the common apparatus to a drying process during which the humid air is cooled to 1° C. until it attains its lowest content of moisture, being afterwards heated again, until it attains the temperature it had prior to drying, while the cold water condensate which results from the de-humidifying process is cooled to a temperature of 1° C. and is utilized again in filtering and cooling new quantities of air which are in turn subject to the drying process and so on.

The apparatus necessary for this method is shown on the attached drawings, in which Figure 1 illustrates in perspective and schematic form the assembly of the climatizer and in heavy lines the improvements which are the object of this invention;

Figure 2 represents the de-humidifier or dryer in accordance with this invention, in plan view;

Figure 3 is a sectional view taken on line y—y of Figure 2;

Figure 4 is a sectional view taken on line x—x of Figure 2;

2

Figures 5 and 6 show an alternate arrangement of the dryer in plan view as well as in vertical transverse section; and Figure 7 shows a general view, in perspective, of a complete climatizer containing the common apparatus for filtering and cooling the air as well as the improvements in accordance with the invention regarding de-humidifying or drying of the air.

In all these drawings the known features and their parts are indicated by letters whereas those elements which constitute the new parts, that is those which form the inventive improvements, are indicated by numerals.

With reference to the drawings, $a$ is the intake air fan, $b$ is the electric motor, $c$ the air filter which is moistened by the water spray $d$, $e$ the centrifugal pump, and $f$ the compressor condenser unit. The air after having been filtered, washed and cooled by the usual process passes then through the dryer.

This dryer in accordance with one preferred embodiment of the invention, consists (Figures 2, 3 and 4) of two parallel spirals 1 and 1' made of tinned copper sheet, rolled in shape, closed on top by a dry sealing and submerged at the bottom in a few centimeters of water 2 in the tank 3. The air circulates in one spiral from the periphery toward the center and returns through the other spiral from the center to the periphery. Each spiral is always between two parallels of opposite sign, thus when the humid air enters through a spiral in the ingoing direction it flows between two sheets which are in contact with the outgoing cold air and in this way the hot and humid air will deposit its moisture on the walls, increasing in coldness as it progresses and cooling itself until in the center it meets a cooler 4, the temperature of which is 1° C., where it attains its lowest temperature and lowest moisture content. From there on the air flows the opposite way, enclosed between two sheets which are in contact with the hot inflowing air, thus absorbing calories and heating itself until at the periphery it reaches the entering temperature. The cold stays inside the spiral and serves only to condense the moisture.

In accordance with another embodiment the dryer or de-humidifier (Figures 5 and 6) consists of two helicoidally shaped plates 1$a$ and 1$b$, in which design the cooler 4$a$ is located at the bottom of the tank 3, partly submerged in the water 2 which it contains.

The water condensate or residue of the drying process, which drops off the walls of the spirals 1 and 1' or of the helicoidally shaped plates 1a and 1b, and off the fins of the cooler 4 or 4a, is collected at the bottom of the tank 3, which encloses the dryer. This water is cold and is further cooled in contact with a cooling coil 5 having a temperature of 1° C. which cooling coil is located on the bottom of tank 3.

From this tank the water is pumped through a conventional or chemical filter (not shown) if the presence of gases should require it, and is fed to the sprayers where it is thrown in a mist against the stream of incoming air and later moistens the air filter c. The water at the bottom of tank 3 is kept at a constant level by an overflow 6, since the amount of condensate increases continually. The excess water is thrown in small droplets onto the radiator of the compressor condenser f increasing, on account of the low temperature, the compression of the gases (freon), and being finally discharged in the form of vapor to the outside atmosphere.

A system of automatic regulation increases or decreases the quantity of the gas (freon) in the central cooler 4, increasing the temperature and consequently decreasing the condensation, as well as in the cooling coil 5 on the bottom of tank 3, increasing or decreasing the temperature and consequently increasing or decreasing the cooling power of the tank.

Such system includes refrigerant supply conduits 17 and 18, connected to the cooler 4 and coil 5, respectively, and controlled by valves 19 and 20, the refrigerant supply coming from the compressor-condenser f through conduit 21, and returning through conduits 22 and 23, respectively, to the compressor-condenser unit.

A dial 7 (Figure 7) indicates these changes while a hydro-thermometer of the cantilever type 8 shows the temperature and humidity of the atmosphere. This operation can easily be made automatic, remotely controlled, or manual.

In Figure 7 the air intake is indicated at 9, the external air intake at 10 through pipe 11, and the discharge of the treated or climatized air at 12. The control knobs indicated by 13, 14, 15 and 16, respectively, are for the starter of the compressor, regulator of the dryer, regulator of the cold temperature and the starter of the water pump and air fan.

As explained, the improvements according to the invention permit the construction of an air conditioner or climatizer which modifies the climate of an ambient atmosphere by changing at will its temperature and humidity and by efficiently cleaning the air of foreign matters and toxic gases.

Having thus described the invention, what is claimed as new and desired to be secured by Letters Patent is:

1. Method of dehumidifying a body of air, in which a quantity of air, after being filtered and cooled by passing the same through a wet filter and a cold water spray, is subjected to a drying process, during which the humid air is cooled until it reaches its lowest moisture content, following which the air is heated until it reaches the temperature which it had before the drying, while the cold water of condensation, residue of the drying process, is further cooled and is utilized in filtering and cooling new quantities of air which are then subjected to the drying process, and continuing the repetition of such cycle.

2. In combination with means for filtering and cooling an air stream by passing the same through a wet filter and a cold water spray, an apparatus for drying the filtered and cooled air comprising a tank, two concentric spiral air passages in said tank, said passages being in heat exchange relationship and both terminating in a central chamber, cooling means in said chamber, means for propelling air inwardly through one of said passages and outwardly through said other passage, a cooling coil in the bottom of said tank, for cooling the condensate deposited therein during the air drying process, and means for circulating said cooled condensate to the means for filtering and cooling the incoming air.

3. Apparatus according to claim 2, including overflow means to limit the depth of condensate in said tank.

References Cited in the file of this patent

UNITED STATES PATENTS

| Number | Name | Date |
| --- | --- | --- |
| 1,863,578 | Morse | June 21, 1932 |
| 2,116,873 | Williams | May 10, 1938 |
| 2,167,878 | Crawford | Aug. 1, 1939 |
| 2,185,047 | Weinstein | Dec. 26, 1939 |
| 2,281,168 | Paget | Apr. 28, 1942 |